United States Patent
Nishii et al.

(10) Patent No.: US 12,455,577 B2
(45) Date of Patent: Oct. 28, 2025

(54) WORK VEHICLE AND METHOD FOR GENERATING AGRICULTURAL FIELD EXTERNAL SHAPE

(71) Applicant: Yanmar Holdings Co., Ltd., Osaka (JP)

(72) Inventors: Yasuto Nishii, Osaka (JP); Yuji Yamaguchi, Osaka (JP); Hidetaka Suzuki, Osaka (JP); Masaaki Murayama, Okayama (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 236 days.

(21) Appl. No.: 18/039,952

(22) PCT Filed: Oct. 27, 2021

(86) PCT No.: PCT/JP2021/039598
§ 371 (c)(1),
(2) Date: Jun. 1, 2023

(87) PCT Pub. No.: WO2022/118568
PCT Pub. Date: Jun. 9, 2022

(65) Prior Publication Data
US 2024/0016074 A1  Jan. 18, 2024

(30) Foreign Application Priority Data
Dec. 2, 2020  (JP) .............................. 2020-200121

(51) Int. Cl.
*G05D 1/648* (2024.01)
*A01B 69/00* (2006.01)
(Continued)

(52) U.S. Cl.
CPC ......... *G05D 1/6484* (2024.01); *A01B 69/004* (2013.01); *A01D 41/1278* (2013.01);
(Continued)

(58) Field of Classification Search
CPC .. G05D 1/6484; G05D 1/0214; G05D 1/2295; G05D 1/2297; G05D 1/617;
(Continued)

(56) References Cited

U.S. PATENT DOCUMENTS 10,740,703 B2 *  8/2020  Story ................... G06Q 10/047
2017/0354078 A1 * 12/2017  Foster .................... A01B 69/00
(Continued)

FOREIGN PATENT DOCUMENTS

EP           3549419 A1    10/2019
JP        2005-242552 A     9/2005
(Continued)

OTHER PUBLICATIONS

Translation of JP-2017158520-A, 14 pages (Year: 2017).*
(Continued)

*Primary Examiner* — Dale W Hilgendorf
(74) *Attorney, Agent, or Firm* — NORTON ROSE FULBRIGHT US LLP

(57) ABSTRACT

A combine (work vehicle) is provided with: a positioning unit that obtains a measurement point indicating a position of a vehicle body; an initial external shape generating unit that generates an initial external shape of an agricultural field on the basis of a travel trajectory of the vehicle body constituted of a plurality of measurement points obtained when the vehicle body was manually driven along an external edge of the agricultural field; and an obstacle identification unit that identifies an obstacle for travel on the basis of the travel trajectory and generates an obstacle area including the identified obstacle.

15 Claims, 10 Drawing Sheets

(51) Int. Cl.
*A01D 41/127* (2006.01)
*G05D 1/00* (2024.01)
*G05D 1/229* (2024.01)
*G05D 1/617* (2024.01)
*G05D 1/622* (2024.01)
*G05D 105/15* (2024.01)
*G05D 107/20* (2024.01)

(52) U.S. Cl.
CPC ......... *G05D 1/0214* (2013.01); *G05D 1/2295* (2024.01); *G05D 1/2297* (2024.01); *G05D 1/617* (2024.01); *G05D 1/622* (2024.01); *G05D 1/637* (2024.01); *G05D 2105/15* (2024.01); *G05D 2107/21* (2024.01)

(58) Field of Classification Search
CPC .... G05D 1/622; G05D 1/637; G05D 2105/15; G05D 2107/21; A01B 69/004; A01D 41/1278
See application file for complete search history.

(56) References Cited

U.S. PATENT DOCUMENTS

2018/0189689 A1* 7/2018 Story ................... G06Q 10/047
2020/0064863 A1* 2/2020 Tomita ................... A01B 69/00

FOREIGN PATENT DOCUMENTS

| | | | | | |
|---|---|---|---|---|---|
| JP | 2006-313519 | A | | 11/2006 | |
| JP | 2017158520 | A | * | 9/2017 | ........... G05D 1/0219 |
| JP | 2019-096363 | A | | 6/2019 | |
| JP | 2019-133701 | A | | 8/2019 | |
| JP | 2019169059 | A | * | 10/2019 | ............... G05D 1/02 |
| JP | 2020000179 | A | * | 1/2020 | ............. A01B 69/00 |
| WO | WO-2017154772 | A1 | * | 9/2017 | ........... G05D 1/0214 |

OTHER PUBLICATIONS

Translation of JP-2019169059-A, 26 pages (Year: 2019).*
Translation of JP-2020000179-A, 6 pages (Year: 2020).*
Translation of WO-2017154772-A1, 19 pages (Year: 2017).*
International Search Report dated Jan. 18, 2022 issued in corresponding PCT Application PCT/JP2021/039598.
Japanese Office Action dated Jul. 2, 2024, issued in JP Application No. 2020-200121.
Extended European Search Report dated Dec. 23, 2024, issued in EP Application No. 21900323.3.

* cited by examiner

WORK VEHICLE AND METHOD FOR GENERATING AGRICULTURAL FIELD EXTERNAL SHAPE

CROSS-REFERENCE TO RELATED APPLICATIONS

This application is a national stage application pursuant to 35 U.S.C. § 371 of International Application No. PCT/JP2021/039598, filed on Oct. 27, 2021, which claims priority under 35 U.S.C. § 119 to Japanese Patent Application No. 2020-200121 filed on Dec. 2, 2020, the disclosures of which are hereby incorporated by reference in their entireties.

TECHNICAL FIELD

The present invention relates to a work vehicle that performs work in an agricultural field and to a method for generating an agricultural field external shape.

BACKGROUND ART

Such a work vehicle has been known that information on an obstacle detected by a front/rear camera or an obstacle sensor is input to an automated driving ECU and that the automated driving ECU sets a travel course to avoid the obstacle (Patent Literature 1).

CITATION LIST

Patent Literature

Patent Literature 1: Japanese Patent Application Publication No. 2020-179

DISCLOSURE OF INVENTION

Problems to be Solved by the Invention

However, the above-described work vehicle is designed on the assumption that the camera or the obstacle sensor can detect the obstacle. That is, the above-described work vehicle cannot handle an obstacle that cannot be detected by the camera or the obstacle sensor.

The present invention provides a work vehicle capable of identifying an obstacle and a method for generating an agricultural field external shape.

Means for Solving the Problems

A work vehicle according to the present invention includes: a positioning unit that obtains a measurement point indicating a position of a vehicle body; an initial external shape generation unit that generates an initial external shape of an agricultural field on the basis of a swept path of the vehicle body, the swept path including the plural measurement points that are obtained when the vehicle body travels manually along an outer edge of the agricultural field; and an obstacle identification unit that identifies an obstacle as an obstacle in traveling on the basis of the swept path, and generates an obstacle area including the identified obstacle.

In this case, the obstacle identification unit may set an autonomous travel enabling area, where autonomous travel can be made, on inside of the initial external shape of the agricultural field, may identify, as the obstacle, an outer area on an outer side of the swept path, which overlaps the autonomous travel enabling area at the time when the swept path overlaps the autonomous travel enabling area, and may set the outer area as the obstacle area.

In this case, the work vehicle may further include a corrected external shape generation unit that generates a corrected external shape of the agricultural field by excluding at least the outer area from the initial external shape of the agricultural field.

In this case, the corrected external shape generation unit may generate an exclusion area and may generate the corrected external shape of the agricultural field by excluding the exclusion area from the initial external shape of the agricultural field, the exclusion area including the measurement point, which constitutes the swept path overlapping the autonomous travel enabling area, and the outer area.

In this case, the work vehicle may further include: a display unit that displays at least the initial external shape and the corrected external shape of the agricultural field and the exclusion area; an input unit that accepts at least one of deformation and addition of the exclusion area displayed on the display unit; and an exclusion area modification unit that performs at least one of the deformation and the addition of the exclusion area on the basis of an operation accepted by the input unit.

In this case, the work vehicle may further include: a display unit that displays at least the swept path and the autonomous travel enabling area; an input unit that accepts a change in a size of the autonomous travel enabling area displayed on the display unit; and a travel area modification unit that changes the size of the autonomous travel enabling area on the basis of an operation accepted by the input unit.

The present invention relates to a method for generating an agricultural field external shape, the method generating an external shape of an agricultural field when a work vehicle travels manually along an outer edge of the agricultural field. The method for generating an agricultural field external shape includes: a swept path generating step to obtain a measurement point indicating a position of a vehicle body and generate a swept path of the vehicle body on the basis of the measurement point; an initial external shape generating step to generate an initial external shape of the agricultural field on the basis of the swept path; and an obstacle identifying step to identify an obstacle as an obstacle in traveling on the basis of the swept path and generate an obstacle area including the identified obstacle.

In this case, the method for generating an agricultural field external shape may further include an area setting step to set an autonomous travel enabling area, where autonomous travel can be made, on the basis of the initial external shape of the agricultural field. In the obstacle identifying step, in the case where the swept path overlaps the autonomous travel enabling area, an outer area on an outer side of the swept path, which overlaps the autonomous travel enabling area, is identified as an obstacle, and the outer area is set as the obstacle area.

In this case, the method for generating an agricultural field external shape may further include a corrected external shape generating step to generate a corrected external shape of the agricultural field by excluding at least the outer area from the initial external shape of the agricultural field.

In this case, the method for generating an agricultural field external shape may further include an exclusion area generating step to generate an exclusion area including the measurement point, which constitutes the swept path overlapping the autonomous travel enabling area, and the outer area. In the corrected external shape generating step, the corrected external shape of the agricultural field may be generated by excluding the exclusion area from the initial external shape of the agricultural field.

In this case, in the exclusion area generating step, at least one of the deformation and the addition of the exclusion area displayed on a display unit may be performed on the basis of an operation input via an input unit.

In this case, in the area setting step, a size of the autonomous travel enabling area displayed on the display unit may be changed on the basis of the operation input via the input unit.

Effect of the Invention

According to the present invention, the obstacle can be identified.

DESCRIPTION OF EMBODIMENTS

A description will hereinafter be made on an embodiment of the present invention with reference to the accompanying drawings. Although terms indicating directions and positions are used in the present specification, such terms are used for convenience of the description and do not limit the technical scope of the present invention.

[Overview of Combine Harvester]

Figure 1:
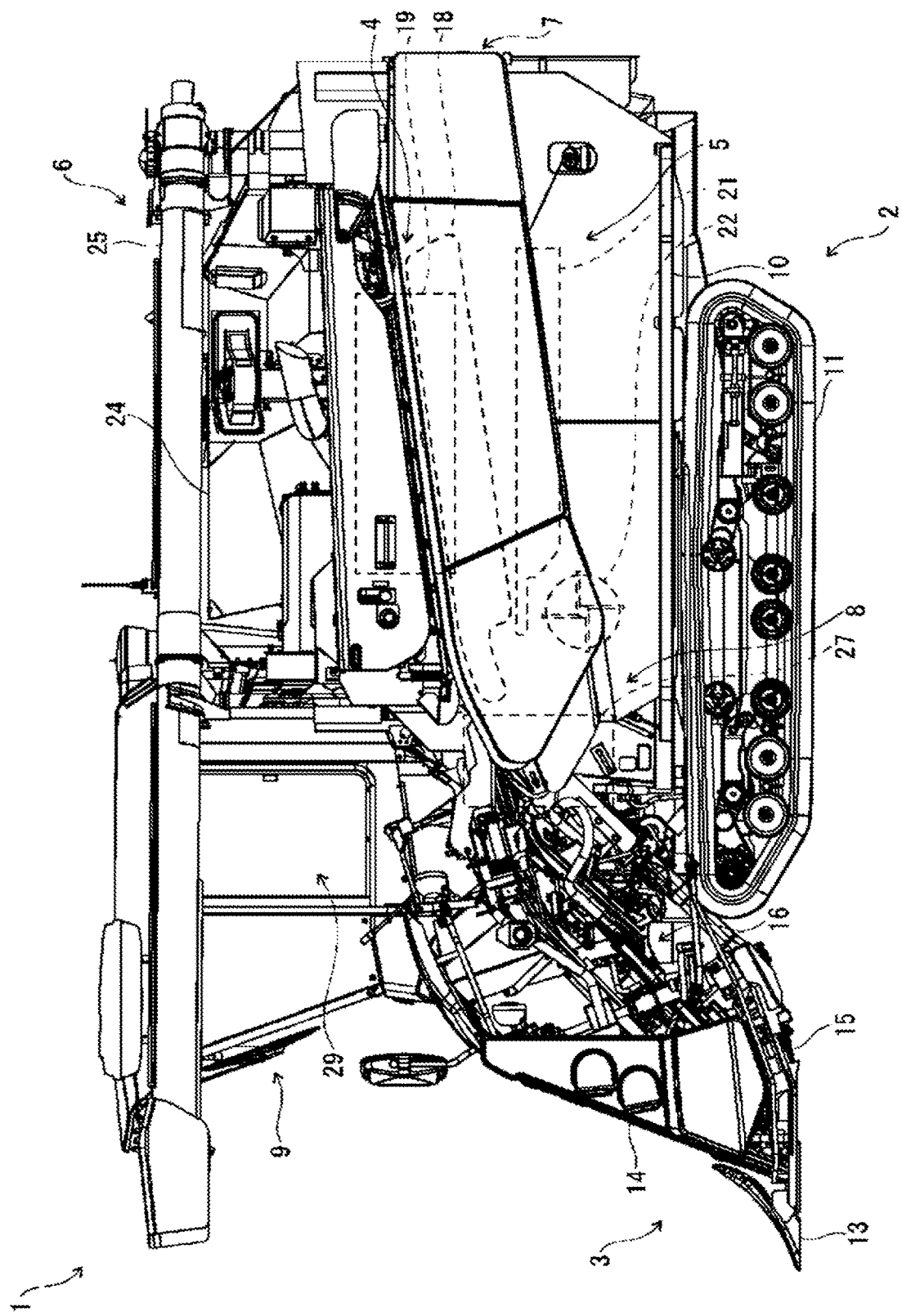
FIG. 1 is a side view illustrating a combine harvester according to an embodiment of the present invention.
Figure 2:
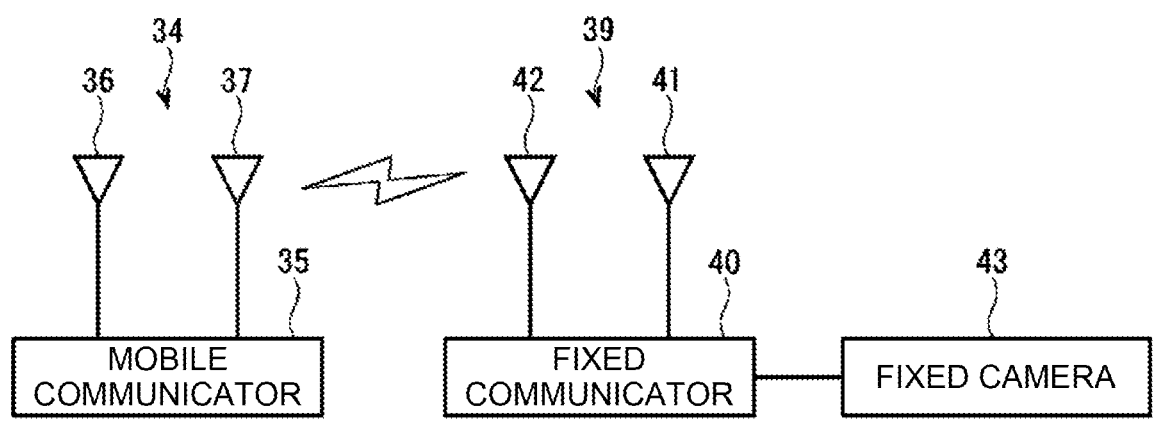
FIG. 2 is a block diagram illustrating a positioning unit of the combine harvester and a base station according to the embodiment of the present invention.

A description will be made on a combine harvester 1 as an example of the work vehicle with reference to FIG. 1 and FIG. 2. FIG. 1 is a side view illustrating the combine harvester 1. FIG. 2 is a block diagram illustrating a positioning unit 34 and a base station 39.

The combine harvester 1 performs work such as reaping of grain culms in an agricultural field as a work target while traveling and turning autonomously in the agricultural field, either by automated driving or by a manual operation. For example, the combine harvester 1 is configured to perform automated work or unmanned work. In the automated work, steering is controlled by automated driving while a travel speed is controlled by the manual operation. In the unmanned work, both of steering and the travel speed are controlled by automated driving.

As illustrated in FIG. 1, the combine harvester 1 includes a travel unit 2, a reaping unit 3, a threshing unit 4, a sorting unit 5, a storage unit 6, a waste straw processing unit 7, a power unit 8, and a steering unit 9. The combine harvester 1 is a so-called self-threshing combine harvester. While the combine harvester 1 travels by the travel unit 2, the grain culms reaped by the reaping unit 3 are threshed by the threshing unit 4, and grains are sorted by the sorting unit 5 and stored in the storage unit 6. In addition, in the combine harvester 1, a pile of waste straw after threshing is processed by the waste straw processing unit 7. The combine harvester 1 drives the travel unit 2, the reaping unit 3, the threshing unit 4, the sorting unit 5, the storage unit 6, and the waste straw processing unit 7 with power supplied from the power unit 8.

The travel unit 2 includes a right and left pair of crawler-type travel units 11 provided below a body frame 10. The crawler-type travel unit 11 is connected to an engine 27 via a transmission (not illustrated) and rotates by output that is generated by the engine 27. When the crawler-type travel unit 11 is rotationally driven, the combine harvester 1 travels in a front-rear direction or turns in a right-left direction.

The reaping unit 3 is provided in front of the travel unit 2. The reaping unit 3 includes a divider 13, a raising device 14, a cutter 15, and a conveyor 16. The divider 13 guides the grain culms on the agricultural field to the raising device 14. The raising device 14 raises the grain culms guided by the divider 13. The cutter 15 cuts the grain culms raised by the raising device 14. The conveyor 16 conveys the grain culms cut by the cutter 15 to the threshing unit 4.

The threshing unit 4 is provided behind the reaping unit 3. The threshing unit 4 includes a feed chain 18 and a threshing cylinder 19. The feed chain 18 conveys, for threshing, the grain culms conveyed from the conveyor 16 of the reaping unit 3, and further conveys the threshed grain culms, that is, the waste straw to the waste straw processing unit 7. The threshing cylinder 19 threshes the grain culms being conveyed by the feed chain 18.

The sorting unit 5 is provided below the threshing unit 4. The sorting unit 5 includes a swing sorting device 21, a wind sorting device 22, a grain conveyor (not illustrated), and a straw scrap discharger (not illustrated). The swing sorting device 21 sifts the threshed grains that have fallen from the threshing unit 4, and sorts the threshed grains into the grains, straw scraps, and the like. The wind sorting device 22 further sorts the threshed grains, which have been sorted by the swing sorting device 21, into the grains, the straw scraps, and the like by air blow. The grain conveyor conveys the grains, which have been sorted by the swing sorting device 21 and the wind sorting device 22, to the storage unit 6. The straw scrap discharger discharges the straw scraps and the like, which have been sorted by the swing sorting device 21 and the wind sorting device 22, to the outside of the combine harvester 1.

The storage unit 6 is provided on a right side of the threshing unit 4. The storage unit 6 includes a grain tank 24 and a discharger 25. The grain tank 24 stores the grains conveyed from the sorting unit 5. The discharger 25 is constructed of an auger and the like, and discharges the grains stored in the grain tank 24 to a suited location.

The waste straw processing unit 7 is provided behind the threshing unit 4. The waste straw processing unit 7 includes a waste straw conveyor (not illustrated) and a waste straw cutter (not illustrated). The waste straw conveyor conveys the waste straw conveyed from the feed chain 18 of the threshing unit 4 to the waste straw cutter. The waste straw cutter cuts the waste straw conveyed by the waste straw conveyor, and discharges the cut waste straw to the outside of the combine harvester 1.

The power unit 8 is provided on an upper front side of the travel unit 2. The power unit 8 includes the engine 27 that generates rotary power. The power unit 8 transmits the rotary power generated by the engine 27 to the travel unit 2, the reaping unit 3, the threshing unit 4, the sorting unit 5, the storage unit 6, and the waste straw processing unit 7.

The steering unit 9 is provided above the power unit 8. The steering unit 9 includes a driver's seat 29, a touchscreen 30 (see FIG. 3), and plural operation tools (not illustrated). The driver's seat 29 is provided in a right portion of a vehicle body, for example, and includes a seat or the like on which a worker is seated. The touchscreen 30 is provided at a position where the operator who is seated on the driver's seat 29 can operates the touchscreen 30. The touchscreen 30 is a display unit that displays images captured by various cameras, which will be described below, and the like, and is also an input unit that is used to operate any of the various devices by touching the respective displayed image. The plural operation tools are operated by the worker who is seated on the driver's seat 29, and include a steering wheel for steering the combine harvester 1, an accelerator for adjusting a speed of the engine 27 (a travel speed of the vehicle body), a lift switch for lifting or lowering the reaping unit 3, and the like.

The combine harvester 1 includes an onboard camera 32 (see FIG. 3) and the positioning unit 34 (see FIG. 2). The onboard camera 32 captures an image of the agricultural field. The positioning unit 34 uses a satellite positioning system such as the Global Positioning System (GPS) to obtain a measurement point 71 (positional information) indicating a position of the vehicle body (the combine harvester 1).

<Positioning Unit>

As illustrated in FIG. 2, the positioning unit 34 includes a mobile communicator 35, a mobile GPS antenna 36, and a data receiving antenna 37. The mobile communicator 35 communicates with a GPS satellite via the mobile GPS antenna 36, so as to obtain positional information of the vehicle body (more precisely, the mobile GPS antenna 36). The mobile communicator 35 obtains the measurement point 71 from the satellite positioning system (the GPS satellite) at predetermined time intervals.

<Base Station>

The base station 39 is installed on a footpath or the like around the agricultural field as the work target of the combine harvester 1. The base station 39 includes a fixed communicator 40, a fixed GPS antenna 41, a data transmitting antenna 42, and a fixed camera 43. The fixed communicator 40 communicates with the GPS satellite via the fixed GPS antenna 41, so as to obtain position information of the base station 39. The fixed communicator 40 transmits correction information, which is based on the position information of the base station 39, to the mobile communicator 35 via the data transmitting antenna 42. The fixed camera 43 captures an image of the agricultural field. The fixed communicator 40 obtains the image (the agricultural field image) that is captured by the fixed camera 43, and transmits the agricultural field image to the mobile communicator 35 via the data transmitting antenna 42. The mobile communicator 35 of the positioning unit 34 receives the correction information and the agricultural field image that are transmitted from the fixed communicator 40 of the base station 39 via the data receiving antenna 37. The mobile communicator 35 corrects the positional information of the vehicle body (the combine harvester 1) on the basis of the correction information. The base station 39 may not be installed, and the positional information may not be corrected by the base station 39.

[Controller]

Figure 3:
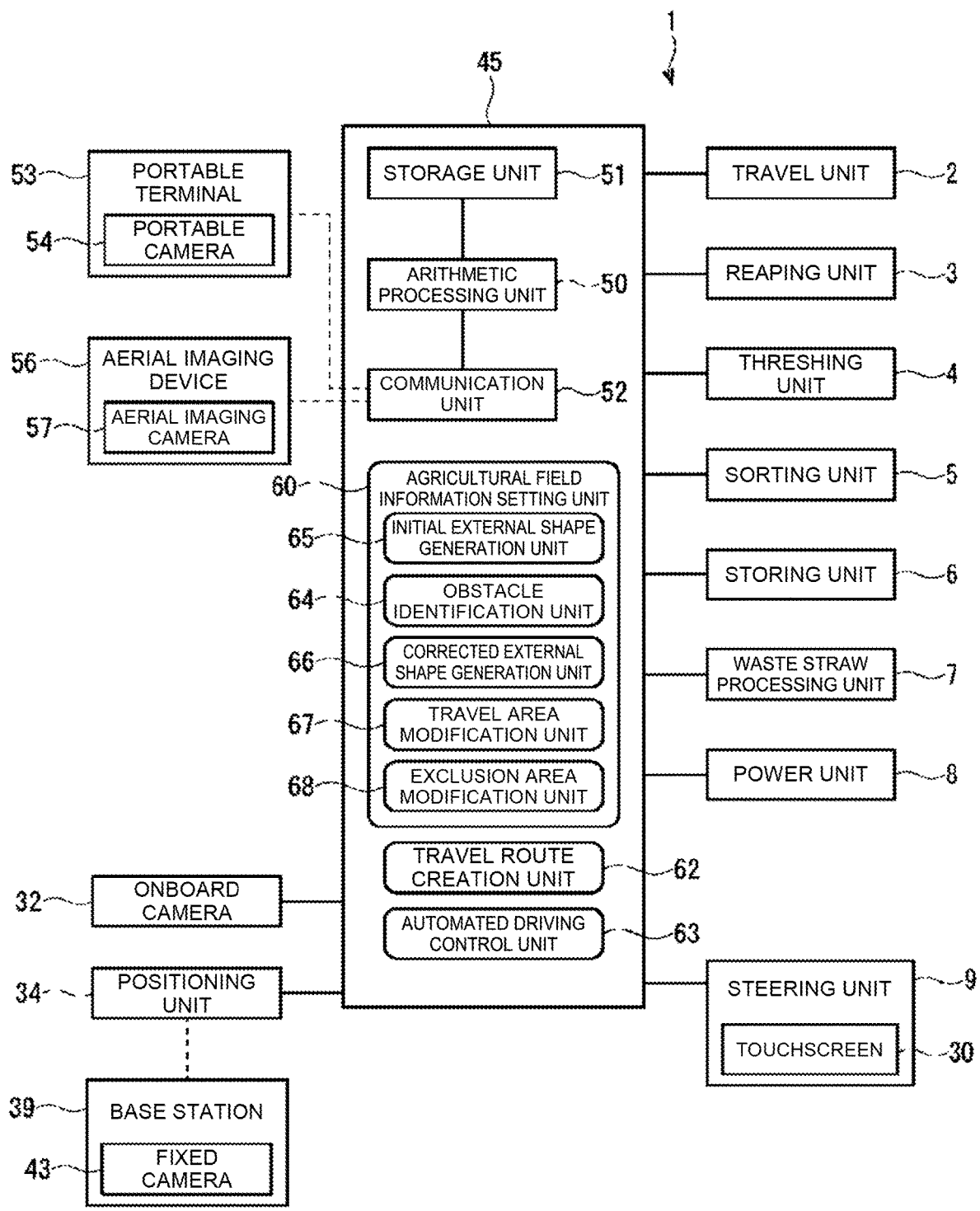
FIG. 3 is a block diagram illustrating the combine harvester according to the embodiment of the present invention.

Next, a description will be made on a controller 45 of the combine harvester 1 with reference to FIG. 3. FIG. 3 is a block diagram illustrating the combine harvester 1.

The controller 45 includes an arithmetic processing unit 50, a storage unit 51, and a communication unit 52. The arithmetic processing unit 50, the storage unit 51, and the communication unit 52 are electrically connected to each other. Each of the above-described various components of the combine harvester 1 are electrically connected to the controller 45 via an interface. The controller 45 controls each of the various components of the combine harvester 1 according to an input operation from the worker via the steering unit 9.

The storage unit 51 is read only memory (ROM), random access memory (RAM), a hard disk drive, or flash memory, for example, and stores programs and data for controlling the various components and various functions of the combine harvester 1. The arithmetic processing unit 50 executes arithmetic processing on the basis of the programs and the data stored in the storage unit 51, so as to control the various components and the various functions of the combine harvester 1. Here, instead of a processor or the like that executes the programs or the like, the controller 45 may be achieved by a logic circuit (hardware) that is formed in an integrated circuit or the like.

The communication unit 52 wirelessly communicates with a portable terminal 53 held by the worker. The portable terminal 53 is a tablet terminal with a touchscreen, for example, and is a terminal that is used to remotely control the combine harvester 1. The portable terminal 53 includes a portable camera 54 that captures an image of the agricultural field. The communication unit 52 also communicates wirelessly with an aerial imaging device 56 such as a drone. The aerial imaging device 56 includes an aerial imaging camera 57 that captures an image of the agricultural field. When the worker inputs an operation instruction for the aerial imaging device 56 to the touchscreen 30 or the portable terminal 53, the aerial imaging device 56 is operated according to the operation instruction that is transmitted from the communication unit 52. Instead of or in addition to the communication unit 52, the aerial imaging device 56 may communicate wirelessly with the portable terminal 53.

When the worker inputs an imaging instruction for each of the cameras 32, 43, 57 to the touchscreen 30 or the portable terminal 53 (hereinafter referred to as the touchscreen 30 or the like), the controller 45 controls and causes the respective cameras 32, 43, 57 to capture the image of the agricultural field. The controller 45 displays the agricultural field image, which is captured by each of the cameras 32, 43, 57, on the touchscreen 30 or the like. Here, when the worker inputs a display instruction for displaying the agricultural field image, which is captured by the portable camera 54, to the touch panel 30 or the like, the controller 45 controls the portable terminal 53 via the communication unit 52 and displays the agricultural field image on the touch panel 30 or the like. The portable terminal 53 or the aerial imaging device 56 may not be provided, and agricultural field information may not be obtained by the portable terminal 53 or the aerial imaging device 56.

The controller 45 obtains the positional information (the measurement point 71) of the combine harvester 1 from the mobile communicator 35 of the positioning unit 34. For example, the controller 45 displays an agricultural field information setting screen on the touchscreen 30 or the like. On the agricultural field information setting screen, the agricultural field information including an external shape 70 of the agricultural field (a shape of an outer edge of the agricultural field) and the like can be set. In addition, the controller 45 displays, on the touchscreen 30 or the like: an agricultural field map that is based on the agricultural field information; and a travel route, which indicates an advancing direction of the combine harvester 1, on the agricultural field map.

[Functions of Controller]

Figure 4:
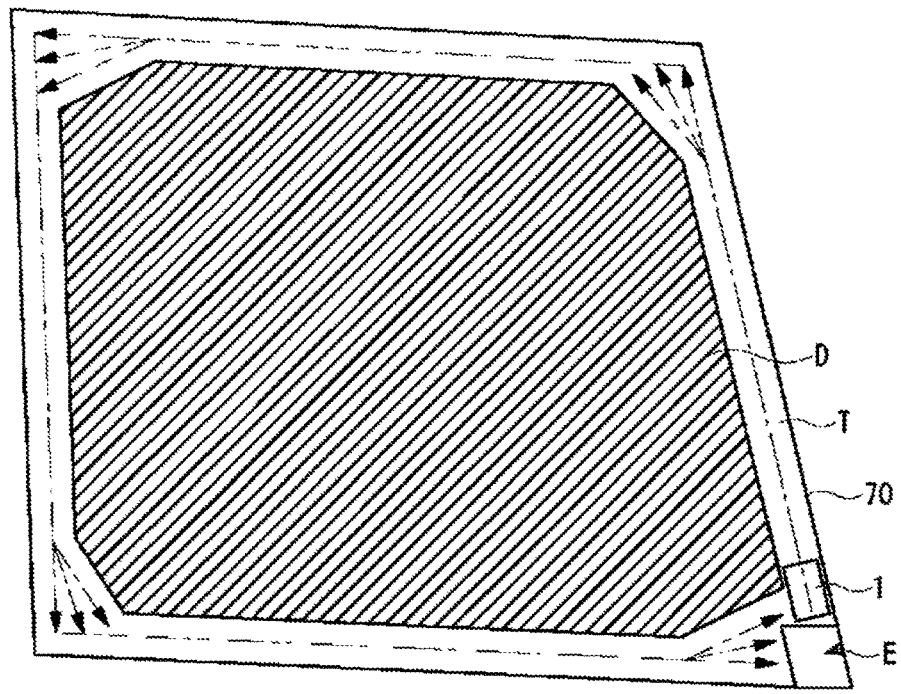
FIG. 4 is a plan view illustrating an external shape of an agricultural field that is a work target of the combine harvester according to the embodiment of the present invention.

Next, a description will be made on functions of the controller 45 with reference to FIG. 3 and FIG. 4. FIG. 4 is a plan view illustrating the external shape 70 of the agricultural field.

As illustrated in FIG. 3, the controller 45 includes an agricultural field information setting unit 60, a travel route creation unit 62, and an automated driving control unit 63. The agricultural field information setting unit 60, the travel route creation unit 62, and the automated driving control unit 63 are provided as the functions of the controller 45, and are specifically realized when the arithmetic processing unit 50 executes the arithmetic processing according to the programs and the data that are stored in the storage unit 51.

<Agricultural Field Information Setting Unit>

As illustrated in FIG. 4, the agricultural field information setting unit 60 generates the external shape 70 (substantially in a rectangular shape in FIG. 4) of the agricultural field when the worker operates and manually drives the combine harvester 1 in a manner to travel around an outer edge of the agricultural field (and reap at the same time). Just as described, when the worker manually drives the combine harvester 1 along the outer edge of the agricultural field, a headland T that serves as a turning space for the combine harvester 1 is formed. The headland T is formed in a substantially rectangular ring shape that surrounds an unreaped area D including the unreaped grain culms. One-dot chain arrows illustrated in FIG. 4 each indicate the advancing direction (a direction to travel around) of the combine harvester 1. The agricultural field information setting unit 60 may obtain the agricultural field information, such as the external shape 70 of the agricultural field, on the basis of information that is manually input by the worker to the agricultural field information setting screen displayed on the touchscreen 30 or the like. In addition to the above, the agricultural field information setting unit 60 may obtain the at least one agricultural field image that is captured by one of the various cameras 32, 43, 54, 57, and may subject the at least one agricultural field image to image analysis, so as to automatically obtain the agricultural field information.

<Travel Route Creation Unit>

The travel route creation unit 62 creates the travel route that is referred by the combine harvester 1 for automated driving (autonomous travel and automated reaping) on the agricultural field. The travel route creation unit 62 generates a travel route on the inside of the external shape 70 (the unreaped area D) of the agricultural field, which is generated by the agricultural field information setting unit 60, and stores the travel route in the storage unit 51. The travel route includes a travel setting about the travel and a work setting about the work such as reaping. The travel setting includes, in addition to a travel position in the agricultural field, the travel speed and the advancing direction (a steering direction, a forward direction, or a reverse direction) at each of the travel positions. The work setting includes information on activation and stop of reaping, a reaping speed, and a reaping height at each of the travel positions as well as other pieces of information on the work.

Preferably, the travel route creation unit 62 sets a straight route on which the combine harvester 1 reaps while traveling, combines the plural straight routes for the unreaped area D, and thereby sets the travel route. Preferably, the travel route creation unit 62 generates the travel route such that reaping proceeds from a periphery of the unreaped area D toward a center thereof. Preferably, the travel route creation unit 62 generates the travel route such that the unreaped area D is located on a left side of the vehicle body. When newly creating or modifying the travel route, the travel route creation unit 62 may select the travel route with high work efficiency from the plural travel routes that are generated temporarily. Here, the work efficiency is determined in consideration of not only the travel associated with reaping but also an idle travel distance, turning, and the like.

The travel route creation unit 62 may set the travel route on the basis of the information that is manually input by the worker using the touchscreen 30 or the like, or may automatically set the travel route on the basis of the agricultural field information that is set by the agricultural field information setting unit 60. The travel route creation unit 62 sets the travel route for a predetermined travel pattern, such as reciprocal reaping travel or turning reaping travel. The travel route includes an idle travel route, on which the combine harvester 1 moves from one of the straight routes to the other straight route, in addition to the straight routes on each of which the combine harvester 1 reaps the grain culms. Thus, the travel route creation unit 62 preferably generates the travel route in a manner to shorten the idle travel route (the idle travel distance).

<Automated Driving Control Unit>

The automated driving control unit 63 controls the power unit 8, the travel unit 2, and the reaping unit 3 on the basis of the travel setting and the work setting for the travel route generated by the travel route creation unit 62, so as to execute automated driving (the autonomous travel and the automated reaping) according to the travel route. The automated driving control unit 63 also controls the threshing unit 4, the sorting unit 5, the storage unit 6, and the waste straw processing unit 7, so as to automatically thresh the reaped grain culms, sort the threshed grains from the straw scraps, store the sorted grains, process the threshed waste straw, and the like. The combine harvester 1 includes a gyroscopic sensor and a direction sensor (a geomagnetic sensor) (none of them is illustrated). The automated driving control unit 63 may obtain displacement information and direction information from these sensors and may adjust automated driving of the combine harvester 1 on the basis of the positional information, the displacement information, and the direction information using the satellite positioning system.

[Configuration of Agricultural Field Information Setting Unit]

Figure 5:
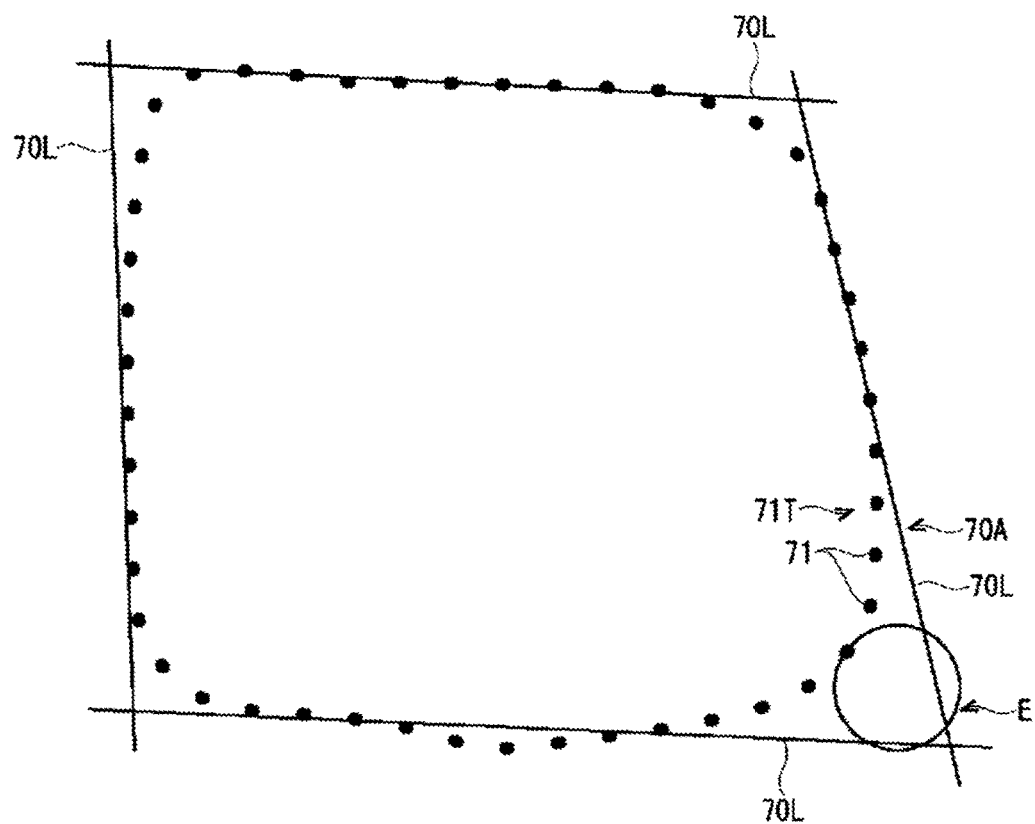
FIG. 5 is a plan view illustrating an initial external shape of the agricultural field as the work target, a swept path, and the like of the combine harvester according to the embodiment of the present invention.
Figure 6:
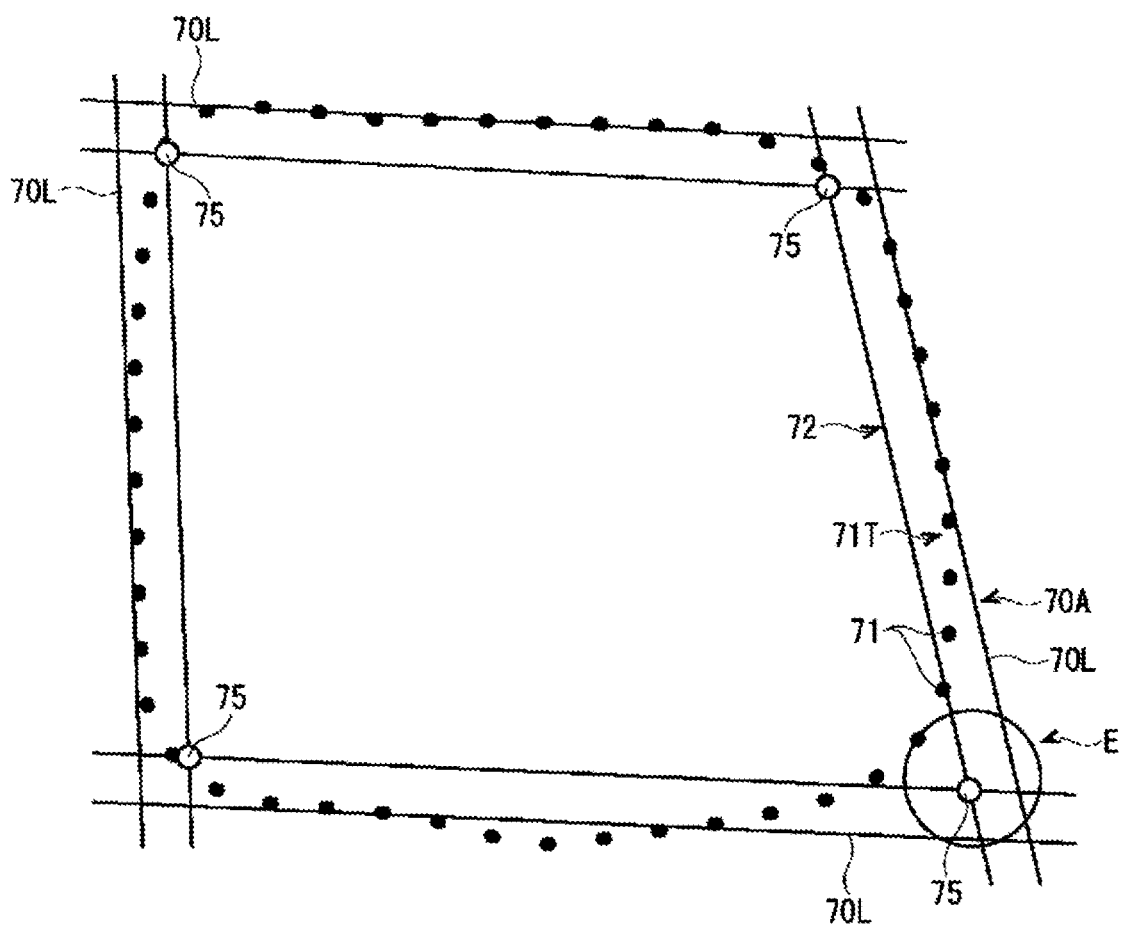
FIG. 6 is a plan view illustrating the initial external shape of the agricultural field as the work target, the swept path, an autonomous travel enabling area, and the like of the combine harvester according to the embodiment of the present invention.
Figure 7:
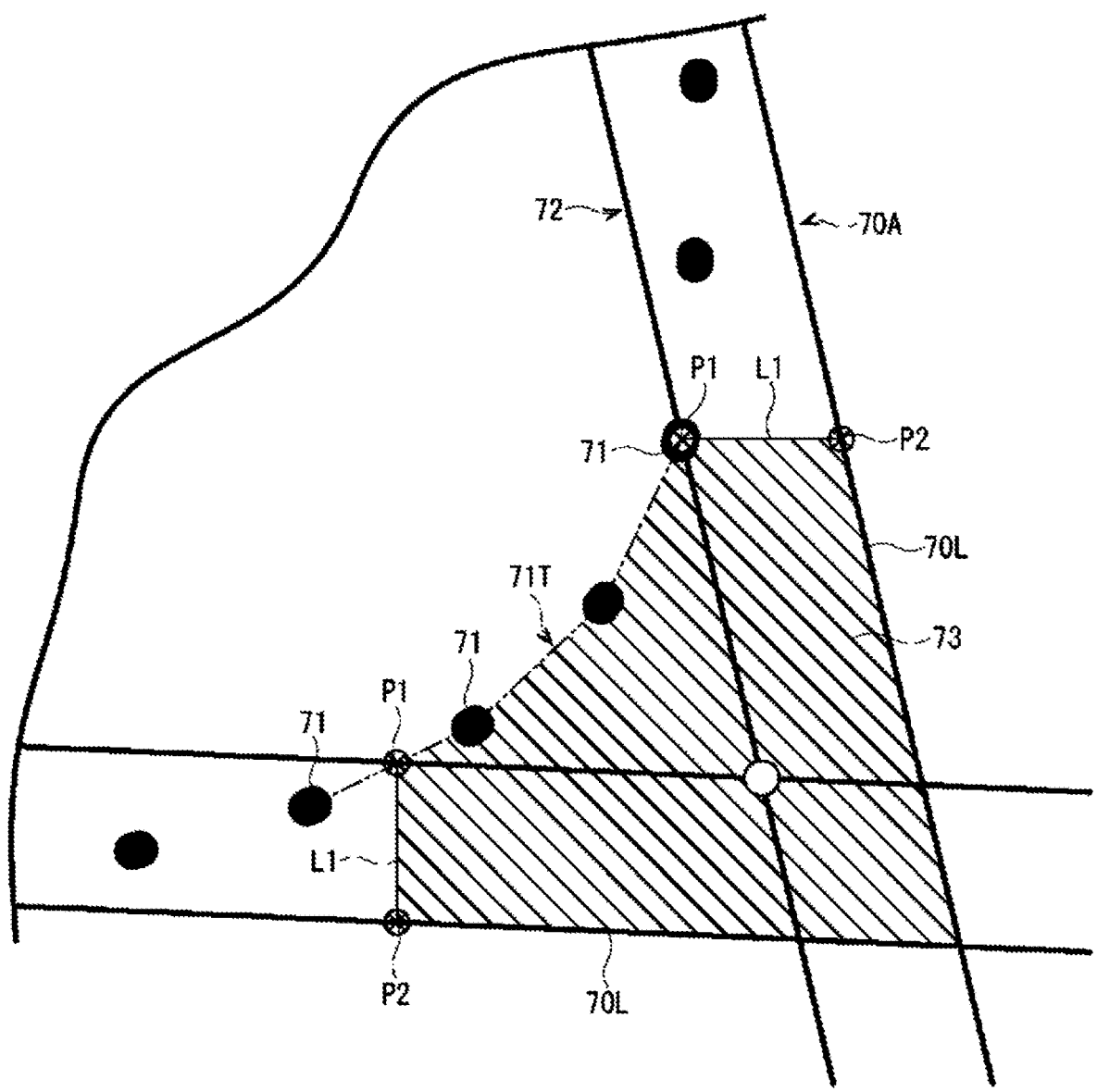
FIG. 7 is a plan view enlarging a state where an outer area is set for the initial external shape of the agricultural field as the work target of the combine harvester according to the embodiment of the present invention.
Figure 8:
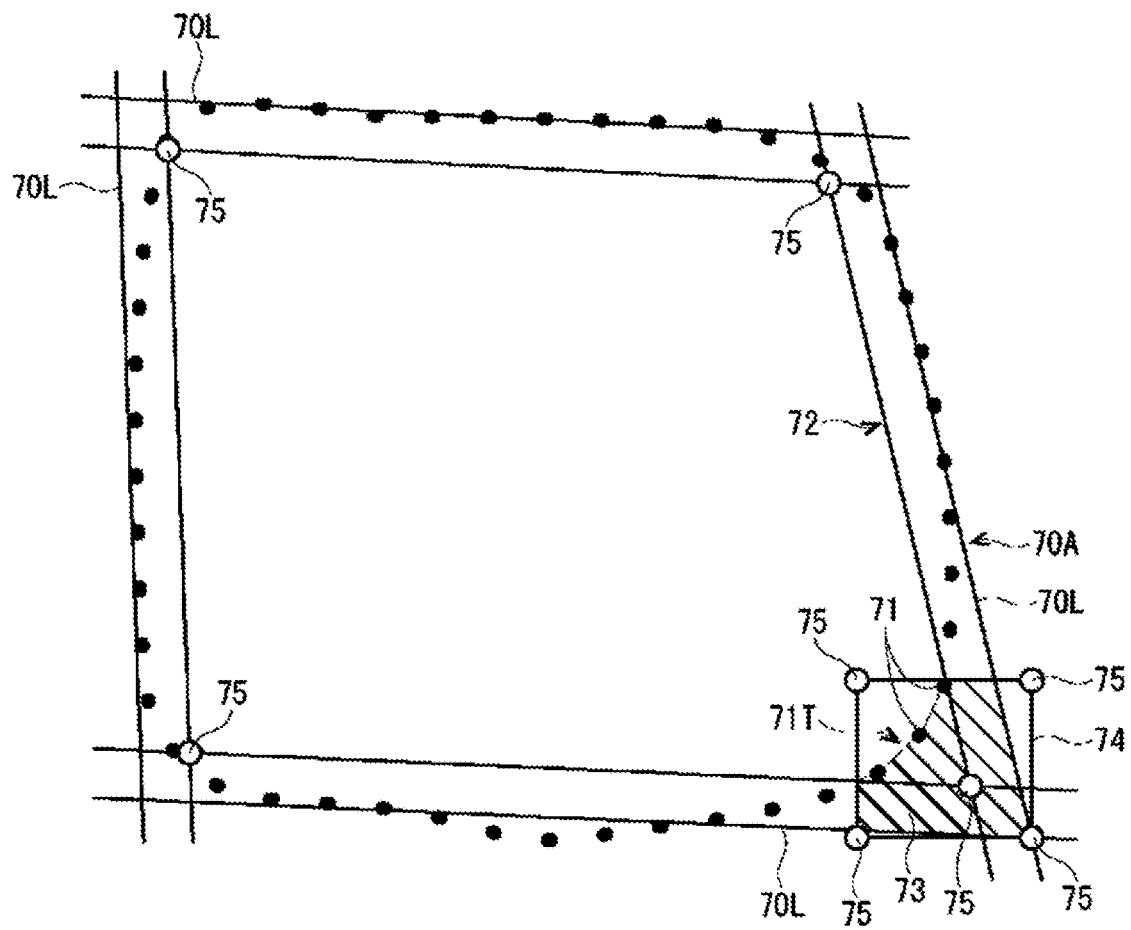
FIG. 8 is a plan view illustrating a state where an exclusion area is set for the initial external shape of the agricultural field as the work target of the combine harvester according to the embodiment of the present invention.
Figure 9:
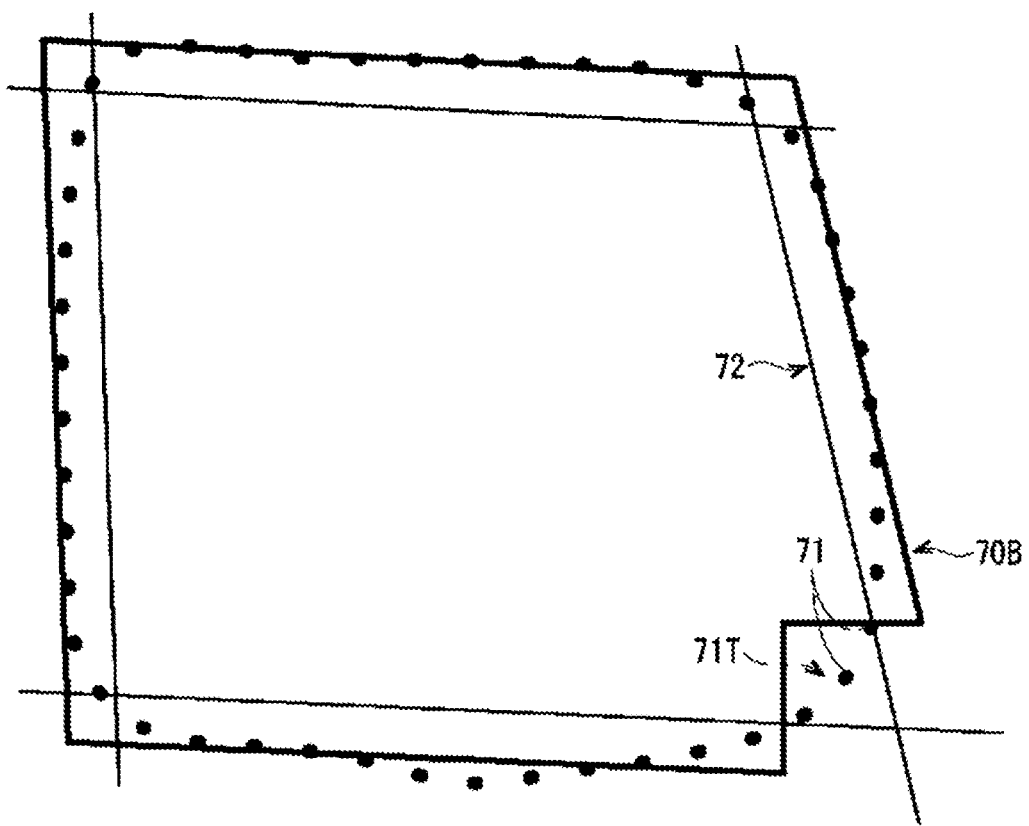
FIG. 9 is a plan view illustrating a corrected external shape of the agricultural field as the work target of the combine harvester according to the embodiment of the present invention.
Figure 10:
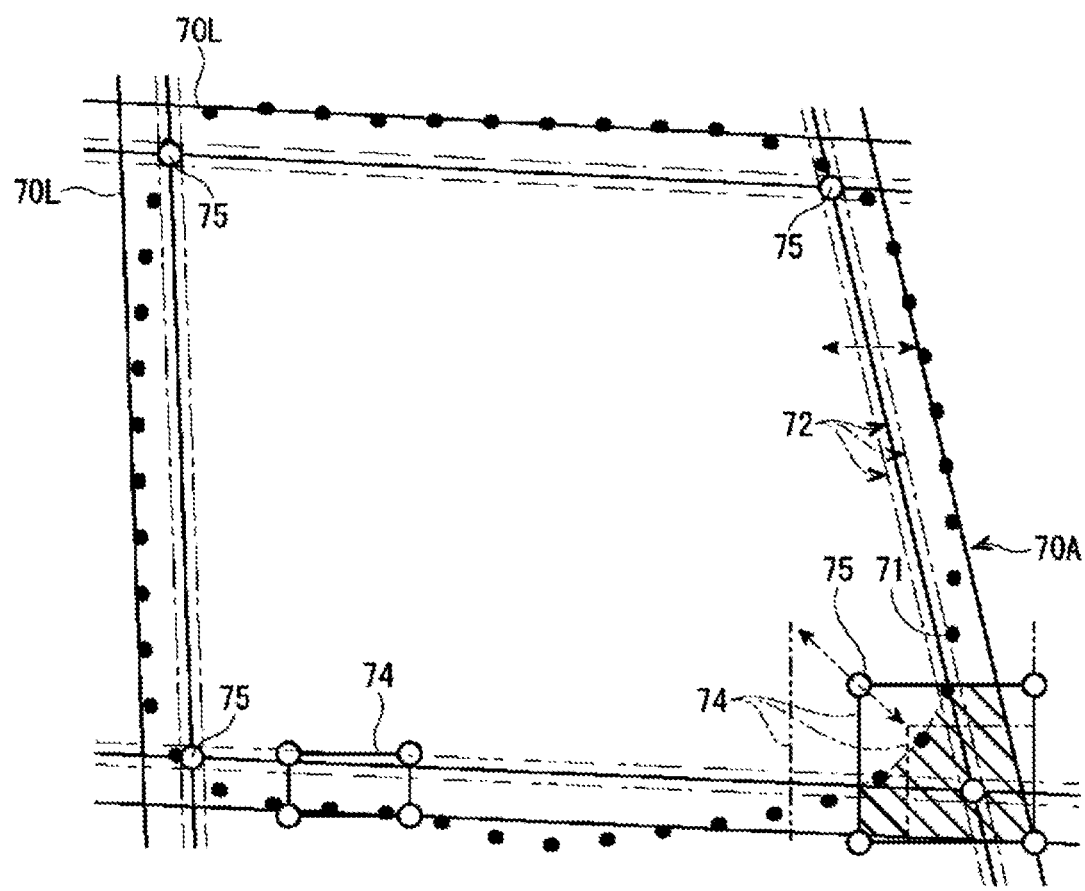
FIG. 10 is a plan view for explaining a change in a size of the autonomous travel enabling area and deformation and addition of the exclusion area that are set for the initial external shape of the agricultural field as the work target of the combine harvester according to the embodiment of the present invention.

Next, a description will be made on a configuration of the agricultural field information setting unit 60 with reference to FIG. 3 and FIG. 5 to FIG. 10. FIG. 5 is a plan view illustrating an initial external shape 70A of the agricultural field, a swept path 71T, and the like. FIG. 6 is a plan view illustrating the initial external shape 70A of the agricultural field, the swept path 71T, an autonomous travel enabling area 72, and the like. FIG. 7 is a plan view enlarging a state where an outer area 73 is set for the initial external shape 70A of the agricultural field. FIG. 8 is a plan view illustrating a state where an exclusion area 74 is set for the initial external shape 70A of the agricultural field. FIG. 9 is a plan view illustrating a corrected external shape 70B of the agricultural field. FIG. 10 is a plan view for explaining a change in a size of the autonomous travel enabling area 72 and deformation and addition of the exclusion area 74.

As it has been described above, the agricultural field information setting unit 60 generates the external shape 70 of the agricultural field in conjunction with the manual travel of the combine harvester 1 by the worker to secure the headland T (see FIG. 4). By the way, various obstacles E exist on the agricultural field. For example, there is a case where an entrance (see FIG. 4) to the agricultural field, a water valve, a drainage port, a covered exhaust port, or the like becomes the obstacle E. In the case where the obstacle E is included in the external shape 70 of the agricultural field, the travel route creation unit 62 sets the travel route on the obstacle E, which possibly inhibits appropriate automated driving. Accordingly, in order to prevent the travel route creation unit 62 from setting the travel route that interferes with the obstacle E, the external shape 70 of the agricultural field has to be set to such a shape that excludes the obstacle E. For this reason, in the combine harvester 1 according to this embodiment, the agricultural field information setting unit 60 has a function to generate the external shape 70 of the agricultural field, from which the obstacle E is excluded.

As illustrated in FIG. 3, the agricultural field information setting unit 60 includes an initial external shape generation unit 65, an obstacle identification unit 64, a corrected external shape generation unit 66, a travel area modification unit 67, and an exclusion area modification unit 68. The initial external shape generation unit 65, the corrected external shape generation unit 66, the travel area modification unit 67, and the exclusion area modification unit 68 are each realized when the arithmetic processing unit 50 executes the arithmetic processing according to the program or the like stored in the storage unit 51.

<Initial External Shape Generation Unit>

As illustrated in FIG. 5, the initial external shape generation unit 65 sets the swept path 71T of the vehicle body. The swept path 71T is formed by the plural measurement points 71 that are obtained when the vehicle body (the combine harvester 1) manually travels along the outer edge of the agricultural field. In addition, the initial external shape generation unit 65 generates the initial external shape 70A of the agricultural field on the basis of the swept path 71T. More specifically, the initial external shape generation unit 65 calculates an approximate straight line 70L on the basis of the swept path 71T (the plural measurement points 71), and sets a polygon surrounded by the plural (four in FIG. 5) approximate straight lines 70L as the initial external shape 70A of the agricultural field. The initial external shape generation unit 65 stores the generated swept path 71T (the plural measurement points 71) and the generated initial external shape 70A of the agricultural field in the storage unit 51. There is a possibility that this initial external shape 70A of the agricultural field includes the obstacle E. Here, the approximate straight line 70L is formed by using the positional information (coordinate data) of two points (a start point and an end point). As a specific example of a method for generating (a method for calculating) the approximate straight line 70L, the initial external shape generation unit 65 may set a straight line that passes a large number of the measurement points 71 as the approximate straight line 70L, may set a straight line that connects the plural measurement points 71 selected manually or automatically as the approximate straight line 70L, or may set an approximate straight line formed by using a least-squares method as the approximate straight line 70L.

<Obstacle Identification Unit>

As illustrated in FIG. 6, the obstacle identification unit 64 sets the autonomous travel enabling area 72 where the autonomous travel can be made on the inside of the initial external shape 70A of the agricultural field, and stores the autonomous travel enabling area 72 in the storage unit 51. The autonomous travel enabling area 72 is set as a range surrounded by plural straight lines that are obtained by moving (shifting) the plural approximate straight lines 70L constituting the initial external shape 70A of the agricultural field in parallel to the inner side. In other words, the autonomous travel enabling area 72 is set to a similar shape that is obtained by shrinking the initial external shape 70A of the agricultural field. An initial value of a parallel movement amount (a shift amount) of each of the straight lines of the autonomous travel enabling area 72 is set to approximately 1 m. However, the initial value of such a shift amount may be changed according to an overall width, a turning radius, the speed, or the like of the combine harvester 1, for example.

The obstacle identification unit 64 identifies the obstacle E, which poses an obstacle to the travel, on the basis of the swept path 71T and generates an obstacle area including the identified obstacle E. More specifically, as illustrated in FIG. 7, in the case where the swept path 71T overlaps the autonomous travel enabling area 72 (the swept path 71T exists on the inside of the autonomous travel enabling area 72), the obstacle identification unit 64 identifies, as the obstacle E, the outer area 73 that is located on the outer side of the swept path 71T overlapping the autonomous travel enabling area 72, and stores the outer area 73 in the storage unit 51. Here, the outer area 73 is generated as an example of the obstacle area. As an example of a method for setting the outer area 73, the obstacle identification unit 64 extends each of two straight lines L1 in a shift direction (a horizontal direction or a perpendicular direction in FIG. 7) from respective one of two intersection points P1 between the autonomous travel enabling area 72 and the swept path 71T toward the adjacent approximate straight line 70L, and calculates each of two intersection points P2 between respective one of the two straight lines L1 and the approximate straight line 70L. Then, the obstacle identification unit 64 sets, as the outer area 73, a range surrounded by the swept path 71T, which overlaps the autonomous travel enabling area 72, the two straight lines L1, and the approximate straight lines 70L between the two intersection points P2. Here, the intersection point P1 between the autonomous travel enabling area 72 and the swept path 71T indicates a point at which the autonomous travel enabling area 72 intersects with the measurement point 71 or a point at which the autonomous travel enabling area 72 intersects with an imaginary straight line (see a two-dot-chain line illustrated in FIG. 7) connecting the adjacent measurement points 71.

<Corrected External Shape Generation Unit>

As illustrated in FIG. 8, the corrected external shape generation unit 66 generates and stores the exclusion area 74 in the storage unit 51. The exclusion area 74 includes the measurement points 71, which constitute the swept path 71T overlapping the autonomous travel enabling area 72, and the outer area 73. For example, the corrected external shape generation unit 66 generates the exclusion area 74 in a rectangular shape (or may be in a square shape) capable of covering all the measurement points 71, which exist on the inside of the autonomous travel enabling area 72, and the outer area 73.

As illustrated in FIG. 9, the corrected external shape generation unit 66 generates the corrected external shape 70B of the agricultural field by excluding the exclusion area 74 from the initial external shape 70A of the agricultural field. More specifically, the corrected external shape generation unit 66 cuts the exclusion area 74 from the initial external shape 70A of the agricultural field, and regenerates the corrected external shape 70B of the agricultural field such that the exclusion area 74 is located on the outside of the outer edge of the agricultural field.

Each of the initial external shape 70A and the corrected external shape 70B of the agricultural field, the autonomous travel enabling area 72, the exclusion area 74, and the like are displayed as a part of the agricultural field information on the touchscreen 30 or the like. The touchscreen 30 or the like also functions as an input unit that accepts a man-made operation to change the size of the displayed autonomous travel enabling area 72, a man-made operation to deform the displayed exclusion area 74, and a man-made operation to (newly) add the exclusion area 74. In addition, the agricultural field information setting unit sets an operation point 75 operable by the worker at a corner of the autonomous travel enabling area 72 and a corner of the exclusion area 74 that are displayed on the touchscreen or the like, and displays the operation points 75 on the touchscreen 30 or the like (see FIG. 6, FIG. 8, and FIG. 10).

<Travel Area Modification Unit>

As indicated by a one-dot-chain line in FIG. 10, the travel area modification unit 67 changes the size of the autonomous travel enabling area 72 on the basis of an operation accepted on the touchscreen 30 or the like. For example, the worker touches any one of the straight lines of the autonomous travel enabling area 72 displayed on the touchscreen 30 with a finger, so as to move (shift) the straight line parallel to the approximate straight line 70L. In addition, the worker touches any one of the operation points 75 of the autonomous travel enabling area 72 displayed on the touchscreen 30 with the finger, so as to move the operation point 75. The travel area modification unit 67 enlarges or reduces (increases or reduces a shift amount of) the autonomous travel enabling area 72 according to the worker's operation. Here, the worker may change the size of the autonomous travel enabling area 72 by operating a mouse that is connected to the touchscreen 30 or the like, or may input the shift amount of the autonomous travel enabling area 72 by operating a keyboard or the like connected to the touchscreen 30 or the like.

<Exclusion area Modification Unit>

As indicated by a two-dot-chain line in FIG. 10, the exclusion area modification unit 68 deforms (changes the size of) the exclusion area 74 on the basis of the operation accepted on the touchscreen 30 or the like. For example, the worker touches the exclusion area 74 that is displayed on the touchscreen 30 with two fingers, and brings the two fingers close to (pinches in) or away from each other (pinches out). In addition, the worker touches any one of the operation points 75 of the exclusion area 74 displayed on the touchscreen 30 with the finger, so as to move the operation point 75. The exclusion area modification unit 68 enlarges, reduces, or deletes the exclusion area 74 according to the worker's operation. Here, the exclusion area modification unit 68 may deform (change the shape of) the rectangular exclusion area 74 to have a parallelogram shape or a trapezoidal shape, for example, without changing the size of the exclusion area 74. In the present specification, deletion is included in "modification".

The exclusion area modification unit 68 adds the exclusion area 74 on the basis of the operation accepted on the touchscreen 30 or the like. For example, when the worker pinches out the initial external shape 70A or the corrected external shape 70B of the agricultural field, which is displayed on the touchscreen 30, at a suited position, the exclusion area modification unit 68 generates (adds) the exclusion area 74 at the pinched-out position (see a lower left portion in FIG. 10). The worker may change the size of or add the exclusion area 74 by operating the mouse that is connected to the touchscreen 30 or the like, or may input the size of and the position to add the exclusion area 74 by operating the keyboard or the like that is connected to the touchscreen 30 or the like.

[Method for Generating Agricultural Field External Shape]

Figure 11:
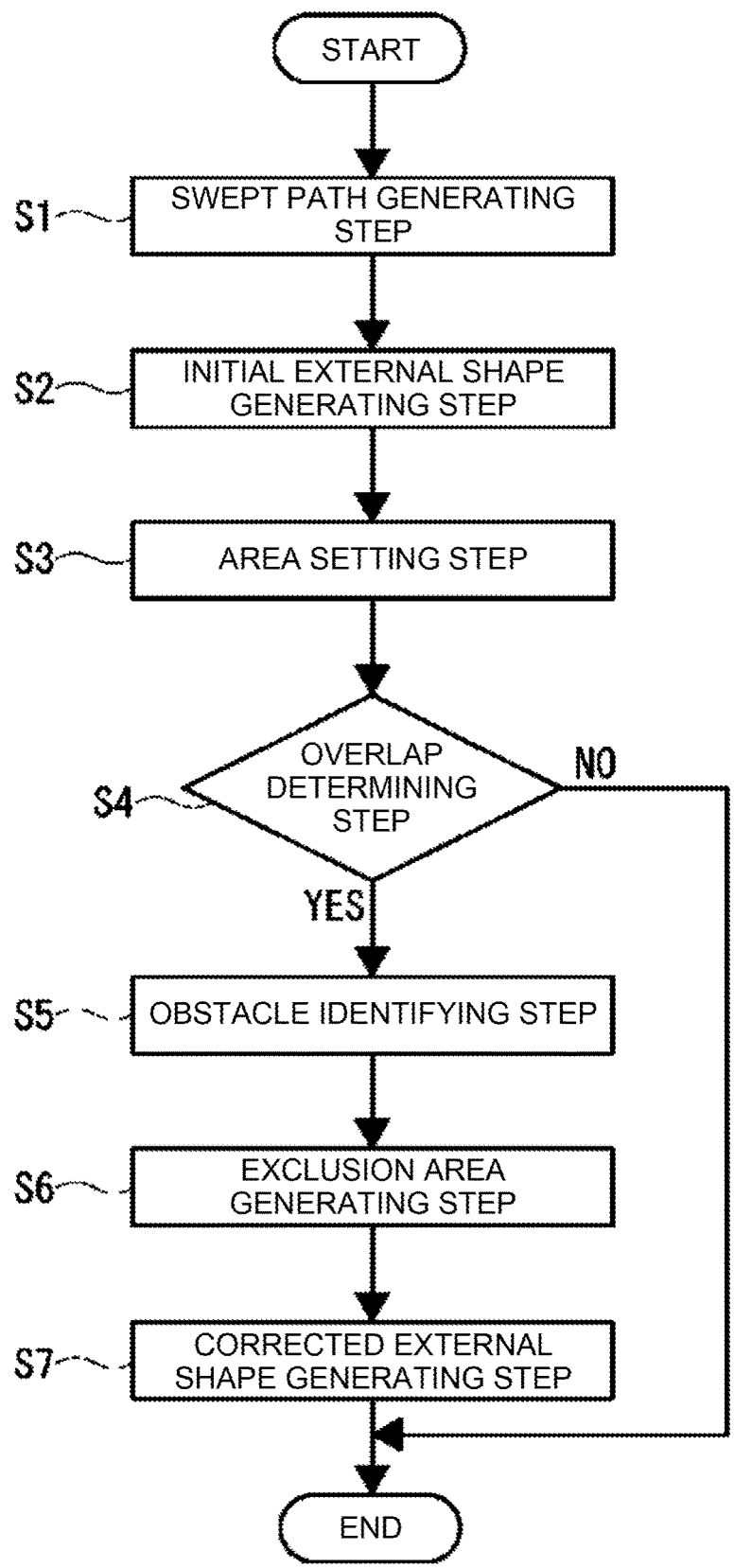
FIG. 11 is a flow chart illustrating a method for generating an agricultural field external shape according to the embodiment of the present invention.

Next, a description will be made on a method for generating an agricultural field external shape with reference to FIG. 11. In the method for generating an agricultural field external shape, the external shape 70 of the agricultural field is generated by manually driving the combine harvester 1 along the outer edge of the agricultural field. FIG. 11 is a flowchart illustrating the method for generating an agricultural field external shape. In this embodiment, it is assumed that the entrance as the obstacle E is provided in a lower right portion of the agricultural field in FIG. 4. In addition, in the present specification, the "external shape 70 of the agricultural field" means the final external shape 70 of the agricultural field that is used when the travel route creation unit 62 creates the travel route. The initial external shape 70A of the agricultural field may become the final external shape 70 of the agricultural field, or the corrected external shape 70B of the agricultural field may become the final external shape 70 of the agricultural field.

First, the worker gets on the driver's seat 29 of the combine harvester 1 and manually drives the combine harvester 1 in a manner to travel around the outer edge of the agricultural field in a counterclockwise direction (see FIG. 4). The positioning unit 34 obtains the positional information (the measurement point 71) of the vehicle body (the combine harvester 1) from the satellite positioning system at the predetermined time intervals.

The initial external shape generation unit 65 receives the measurement points 71 from the positioning unit 34, and generates the swept path 71T of the vehicle body (see FIG. 5) on the basis of the measurement points 71 (a swept path generating step S1). Next, the initial external shape generation unit 65 creates the approximate straight lines 70L on the basis of the swept path 71T, so as to generate the initial external shape 70A of the agricultural field (see FIG. 5) from the approximate straight lines 70L (an initial external shape generating step S2).

The obstacle identification unit 64 shifts the initial external shape 70A (the approximate straight lines 70L) of the agricultural field inward to set the autonomous travel enabling area 72 (see FIG. 6) (an area setting step S3). Here, the worker may perform an operation to enlarge or reduce (increase or reduce the shift amount of) the autonomous travel enabling area 72, which is displayed on the touchscreen 30, in consideration of an actual state of the agricultural field, specifications (a vehicle width, the vehicle speed, and the like) of the combine harvester 1, the worker's own driving skill and experience, and the like (see FIG. 10). In the area setting step S3, the travel area modification unit 67 changes the size of the autonomous travel enabling area 72, which is displayed on the touchscreen or the like, on the basis of the operation input via the touchscreen 30 or the like.

The obstacle identification unit 64 determines whether the swept path 71T overlaps the autonomous travel enabling area 72 (an overlap determining step S4). If the swept path 71T overlaps the autonomous travel enabling area 72 (YES in the overlap determining step S4), the obstacle identification unit 64 identifies, as the obstacle, the outer area 73 located on the outer side of the swept path 71T, which overlaps the autonomous travel enabling area 72 (see FIG. 7), and sets the outer area 73 as the obstacle area (an obstacle identifying step S5). On the other hand, if the swept path 71T does not overlap the autonomous travel enabling area 72 (NO in the overlap determining step S4), the obstacle identification unit 64 does not identify the obstacle E, and adopts the initial external shape of the agricultural field as the final external shape 70 of the agricultural field that is used when the travel route creation unit 62 creates the travel route.

Next, the corrected external shape generation unit 66 generates the exclusion area 74 (see FIG. 8) including the swept path 71T (the measurement points 71), which overlaps the autonomous travel enabling area 72, and the outer area 73 (an exclusion area generating step S6). Here, the worker may perform an operation to deform (increase, reduce, delete, or the like) the exclusion area 74, which is displayed on the touchscreen 30, in consideration of the actual state of the agricultural field, the specifications (the vehicle width, the vehicle speed, and the like) of the combine harvester 1, the worker's own driving skill and experience, and the like (see FIG. 10). In the exclusion area generating step S6, the exclusion area modification unit 68 deforms or adds the exclusion area 74 on the basis of the operation input via the touchscreen 30 or the like.

Next, the corrected external shape generation unit 66 excludes the exclusion area 74 from the initial external shape 70A of the agricultural field to generate the corrected external shape 70B of the agricultural field (see FIG. 9) (a corrected external shape generating step S7). The corrected external shape generation unit 66 stores the corrected external shape 70B of the agricultural field, which has been generated, as the final external shape 70 of the agricultural field in the storage unit 51. The final external shape 70 of the agricultural field is used when the travel route creation unit 62 creates the travel route.

As it has been described so far, the external shape 70 of the agricultural field, from which the obstacle E is excluded, is generated. Thereafter, the travel route creation unit 62 generates the travel route, which is referred for automated driving, in the external shape 70 (the unreaped area D) of the agricultural field. In the case where the corrected external shape 70B of the agricultural field is adopted as the final external shape 70 of the agricultural field, a portion of the agricultural field, from which the exclusion area 74 is cut out, (a portion for avoidance of the obstacle E) is projected inward. As a result, the travel route in such a portion is generated as extremely short straight lines. For this reason, preferably, the travel route creation unit 62 does not create the travel route around the portion, from which the exclusion area 74 is cut out, (the portion for avoidance of the obstacle E) so as not to create the travel route with the extremely short straight lines. Preferably, the worker manually drives the combine harvester 1 around the portion, from which the exclusion area 74 is cut out.

The combine harvester 1 (the method for generating an agricultural field external shape) according to this embodiment that has been described so far is configured that the obstacle identification unit 64 identifies the obstacle E as the obstacle to the travel on the basis of the swept path 71T and generates the outer area 73 (the obstacle area) including the identified obstacle E. With such a configuration, it is possible to accurately identify the obstacle E. It is also configured that the corrected external shape generation unit 66 identifies the obstacle E on the basis of the swept path 71T by the manual travel and generates the corrected external shape 70B of the agricultural field, which is obtained by excluding the obstacle E from the initial external shape 70A of the agricultural field. With such a configuration, it is possible to identify the obstacle E, which cannot be detected by the camera or the sensor, from the swept path 71T and thus to generate the external shape 70 (the corrected external shape 70B) of the agricultural field in the manner to avoid the obstacle E. In this way, it is possible to reduce a burden of an operator to manually input the obstacle E, which cannot be detected by the camera or the sensor, to the terminal, for example. In addition, since the appropriate external shape 70 of the agricultural field can be generated, it is possible to set the efficient travel route with little leftover threshing.

With the combine harvester 1 according to this embodiment, it is possible to accurately identify the obstacle E by detecting the overlap between the swept path 71T and the autonomous travel enabling area 72. In this way, it is possible to position the identified obstacle E on the outside of the external shape 70 of the agricultural field. That is, it is possible to generate the corrected external shape 70B of the agricultural field, from which the obstacle E is appropriately excluded.

The combine harvester 1 according to this embodiment is configured that the worker can perform the operation to deform or add the exclusion area 74 on the touchscreen 30 or the like. With such a configuration, the worker can flexibly change the size and the shape of the exclusion area 74 while checking the actual state (the position, the size, and the like of the obstacle E) of the agricultural field. For example, the exclusion area 74 may be reduced for the worker with the high driving skill while the exclusion area 74 may be increased for the worker with the poor driving skill. In addition, for example, in the case where the swept path 71T overlaps the autonomous travel enabling area 72 due to such manual travel to avoid mud or the like in the agricultural field, the obstacle E does not exist in reality. Thus, the worker can delete the exclusion area 74. Furthermore, for example, in the case where there is a location where the obstacle E does not exist but the worker determines that exclusion thereof is preferred, the exclusion area 74 can be added. That is, the plural exclusion areas 74 can be set.

With the combine harvester 1 according to this embodiment, the worker can flexibly change the size of the autonomous travel enabling area 72 while checking the actual state of the agricultural field. In this way, it is possible to select a degree of importance of the determination of the obstacle E (a threshold with which the obstacle E is determined) according to the actual state of the agricultural field, the specifications of the combine harvester 1, the worker's driving skill or experience, or the like.

In the combine harvester 1 according to this embodiment that has been described so far, the corrected external shape generation unit 66 extends the two straight lines L1 in the shift directions (the horizontal direction and the perpendicular direction) from the two intersection points P1 between the autonomous travel enabling area 72 and the swept path 71T toward the approximate straight lines 70L. However, the present invention is not limited thereto. For example, the corrected external shape generation unit 66 may extend the two straight lines L1 such that each of the straight lines L1 crosses the approximate straight line 70L at a right angle (not illustrated). Alternatively, the corrected external shape generation unit 66 may extend the two straight lines L1 such that a suited angle is defined by each of the straight lines L1 and the approximate straight line 70L or the autonomous travel enabling area 72 (not illustrated).

In the combine harvester 1 according to this embodiment, the exclusion area 74 is formed in the rectangular shape. However, the present invention is not limited thereto. The exclusion area 74 may be in any shape as long as the measurement point 71, which overlaps the autonomous travel enabling area 72, and the outer area 73 can be included therein. For example, the exclusion area 74 may be in a triangular shape, the trapezoidal shape, a polygonal shape with five sides or more, or a circular shape (an oval shape) (not illustrated). In addition, the outer area 73 (see FIG. 7), which is identified as the obstacle E, may be set as the exclusion area 74.

In the combine harvester 1 according to this embodiment, the corrected external shape generation unit 66 generates the exclusion area 74 including the measurement point 71, which overlaps the autonomous travel enabling area 72, and the outer area 73 and generates the corrected external shape 70B by excluding the exclusion area 74 from the initial external shape 70A of the agricultural field. However, the present invention is not limited thereto. For example, the exclusion area generating step S6 may not be executed (the exclusion area 74 may not be generated). Then, in the corrected external shape generating step S7, the corrected external shape generation unit 66 may generate the corrected external shape 70B of the agricultural field by excluding the outer area 73 from the initial external shape 70A of the agricultural field. In other words, the corrected external shape generation unit 66 only needs to exclude at least the outer area 73, and may generate the corrected external shape 70B of the agricultural field in a manner to position the measurement point 71, which overlaps the autonomous travel enabling area 72, on the outside of the outer edge of the agricultural field.

The combine harvester 1 according to this embodiment is configured that the touchscreen 30 or the like can accept both of the operation to deform the displayed exclusion area 74 and the operation to add the displayed exclusion area 74. However, the present invention is not limited thereto. The touchscreen 30 or the like may only accept one of the operation to deform the exclusion area 74 and the operation to add the exclusion area 74 (may not accept the other of the operation to deform the exclusion area 74 and the operation to add the exclusion area 74). In addition, the exclusion area modification unit 68 may be configured to perform only one of the deformation and the addition of the exclusion area 74 on the basis of the operation accepted on the touchscreen 30 or the like (may be configured not to be able to perform the other of the deformation and the addition of the exclusion area 74).

In the combine harvester 1 according to this embodiment, the corrected external shape generation unit 66 generates the corrected external shape 70B of the agricultural field by excluding the exclusion area 74 from the initial external shape 70A of the agricultural field. However, the present invention is not limited thereto. For example, in the obstacle identifying step S5, the obstacle identification unit 64 identifies the entrance (the obstacle) of the traveled agricultural field on the basis of the swept path, and generates an entrance area (another example of the obstacle area) that includes the identified entrance. Then, the obstacle identification unit 64 may set the entrance area, where the autonomous travel cannot be made, for the initial external shape 70A of the agricultural field. In this case, the initial external shape 70A of the agricultural field, for which the entrance area is set, becomes the final external shape 70 of the agricultural field. Thus, the corrected external shape generation unit 66 (the exclusion area generating step S6 and the corrected external shape generating step S7) described above may not be provided.

In the combine harvester 1 according to this embodiment, the touchscreen 30 or the touchscreen of the portable terminal 53 (the tablet terminal) serves as the display unit that displays the information and the input unit that accepts the man-made operation. However, the present invention is not limited thereto. For example, the steering unit 9 may include a laptop computer (not illustrated) instead of the touchscreen 30. Similarly, for example, the portable terminal 53 may be the laptop computer (not illustrated). In each of these cases, a liquid-crystal display is an example of the display unit, and a pair of the keyboard and the mouse is an example of the input unit.

In the combine harvester 1 according to this embodiment, the touchscreen 30 is provided as a separate component from the portable terminal 53. However, the present invention is not limited thereto. The touchscreen 30 may be provided detachably, and the touchscreen 30 may be used as the portable terminal 53.

In the combine harvester 1 according to this embodiment, the touchscreen 30 or the like serves as both of the display unit that displays the information and the input unit that accepts the man-made operation. However, the present invention is not limited thereto. For example, the display unit such as the liquid-crystal display may separately be provided from the input unit including the keyboard, the mouse, a button, a switch, or the like (not illustrated).

In the combine harvester 1 according to this embodiment, the travel route creation unit 62 generates the travel route (the autonomous travel route), which is referred for automated driving, in the external shape 70 (the unreaped area D) of the agricultural field. However, the present invention is not limited thereto. For example, the worker may be able to select whether to generate the autonomous travel route or make the manual travel via the touchscreen 30 or the like (not illustrated).

In this embodiment, the present invention is applied to the combine harvester 1. However, the present invention is not limited thereto. The present invention can also be applied to a work vehicle, such as a tractor or a rice transplanter, for which the external shape 70 of the agricultural field has to be identified to generate the travel route to be referred for automated driving.

The above embodiment has been described to present one aspect of the work vehicle and the method for generating an agricultural field external shape according to the present invention. Thus, the technical scope of the present invention is not limited to the above embodiment. The technical scope of the present invention is not limited to the above embodiment. The present invention may be changed, substituted, or transformed in various ways without departing from the gist of the technical scope, and the claims include all possible embodiments that may be included within the scope of the technical idea.

DESCRIPTION OF REFERENCE NUMERALS

1 Combine harvester (work vehicle)
30 Touchscreen (display unit, input unit)
34 Positioning unit
53 Portable terminal (display unit, input unit)
64 Obstacle identification unit
65 Initial external shape generation unit
66 Corrected external shape generation unit
67 Travel area modification unit
68 Exclusion area modification unit
70A Initial external shape
70B Corrected external shape
71 Measurement point
71T Swept path
72 Autonomous travel enabling area
73 Outer area
74 Exclusion area
E Obstacle
S1 Swept path generating step
S2 Initial external shape generating step
S3 Area setting step
S5 Obstacle identifying step
S6 Exclusion area generating step
S7 Corrected external shape generating step

The invention claimed is:

1. A work vehicle comprising:
a positioning unit configured to obtain a measurement point indicating a position of a vehicle body;
an initial external shape generation unit configured to generate an initial external shape of an agricultural field based on a swept path of the vehicle body, the swept path including a plurality of measurement points that are obtained when the vehicle body travels manually along an outer edge of the agricultural field, the plurality of measurement points including the measurement point, and wherein the initial external shape is defined by a plurality of straight lines connected to one another;
an obstacle identification unit configured to:
identify an obstacle associated with traveling of the vehicle body based on the swept path; and
generate an obstacle area including the identified obstacle, wherein the obstacle area is defined by a first straight line of the plurality of straight lines, a second straight line of the plurality of straight lines, the swept path, a line connecting the swept path and the first straight line, and a line connecting the swept path and the second straight line; and
an automated driving control unit configured to control automated traveling of the work vehicle based on the initial external shape, the swept path, and the obstacle area.

2. The work vehicle according to claim 1, wherein the obstacle identification unit is configured to:
set an autonomous travel enabling area, where autonomous travel is made, on inside of the initial external shape of the agricultural field;
wherein the obstacle area overlaps the autonomous travel enabling area.

3. The work vehicle according to claim 2, further comprising:
a corrected external shape generation unit configured to exclude at least the obstacle area from the initial external shape of the agricultural field to generate a corrected external shape of the agricultural field.

4. The work vehicle according to claim 3, wherein the corrected external shape generation unit is configured to:
generate an exclusion area including the measurement point, which constitutes the swept path overlapping the autonomous travel enabling area, and the obstacle area.

5. The work vehicle according to claim 4, further comprising:
a display unit configured to display at least the initial external shape and the corrected external shape of the agricultural field and the exclusion area;
an input unit configured to accept deformation or addition of the exclusion area displayed on the display unit; and
an exclusion area modification unit configured to perform the deformation or the addition of the exclusion area based on an operation accepted by the input unit.

6. The work vehicle according to claim 2, further comprising:
a display unit configured to display at least the swept path and the autonomous travel enabling area;
an input unit configured to accept a change in a size of the autonomous travel enabling area displayed on the display unit; and
a travel area modification unit configured to change the size of the autonomous travel enabling area based on an operation accepted by the input unit.

7. The work vehicle according to claim 2, wherein the autonomous travel enabling area is defined by a second plurality of straight lines,
the swept path intersects a third straight line of the second plurality of straight lines at a first point,
the swept path intersects a fourth straight line of the second plurality of straight lines at a second point,
the line connecting the swept path and the first straight line intersects the swept path at the first point, and
the line connecting the swept path and the second straight line intersects the swept path at the second point.

8. The work vehicle according to claim 2, further comprising:
a corrected external shape generation unit configured to generate an exclusion area that is defined by the first straight line, the second straight line, a first extension of the line connecting the swept path and the first straight line, and a second extension of the line connecting the swept path and the second straight line,
wherein the first extension intersects the second extension.

9. The work vehicle according to claim 8, wherein the corrected external shape generation unit is further configured to generate a corrected external shape of the agricultural field by modifying the initial external shape of the agricultural field to eliminate the portion of the initial external shape within the exclusion area and instead include a boundary along the exclusion area.

10. A method for generating an agricultural field external shape, the method comprising:

generating an external shape of an agricultural field when a work vehicle travels manually along an outer edge of the agricultural field, wherein generating the external shape of the agricultural field includes:

obtaining a measurement point indicating a position of a vehicle body;

generating a swept path of the vehicle body based on the measurement point;

generating an initial external shape of the agricultural field based on the swept path, wherein the initial external shape is defined by a plurality of straight lines connected to one another;

identifying an obstacle associated with traveling of the work vehicle based on the swept path; and generating an obstacle area including the identified obstacle, wherein the obstacle area is defined by a first straight line of the plurality of straight lines, a second straight line of the plurality of straight lines, the swept path, a line connecting the swept path and the first straight line, and a line connecting the swept path and the second straight line; and controlling automated traveling of the work vehicle based on the initial external shape, the swept path, and the obstacle area.

11. The method according to claim 10, further comprising:

setting an autonomous travel enabling area, where autonomous travel is performed based on the initial external shape of the agricultural field; and wherein the obstacle area overlaps the autonomous travel enabling area.

12. The method according to claim 11, further comprising:

excluding at least the obstacle area from the initial external shape of the agricultural field to generate a corrected external shape of the agricultural field.

13. The method according to claim 12, further comprising:

generating an exclusion area including the measurement point, which constitutes the swept path overlapping the autonomous travel enabling area, and the obstacle area; and excluding the exclusion area from the initial external shape of the agricultural field to generate the corrected external shape of the agricultural field.

14. The method according to claim 13, further comprising performing, based on an operation input via an input unit, at least one of deformation and addition of the exclusion area displayed on a display unit.

15. The method according to claim 11, further comprising changing, based on an operation input via an input unit, a size of the autonomous travel enabling area displayed on a display unit.

* * * * *